United States Patent [19]

Pires

[11] Patent Number: 5,070,978
[45] Date of Patent: Dec. 10, 1991

[54] ONE WAY DRIVE DEVICE

[76] Inventor: Paul B. Pires, 1350 Dundee Ave., Ben Lomond, Calif. 95005

[21] Appl. No.: 511,226

[22] Filed: Apr. 19, 1990

[51] Int. Cl.⁵ .................... F16D 41/06; F16D 41/12
[52] U.S. Cl. .................................... 192/45.1; 192/46
[58] Field of Search ............... 192/41 R, 45.1, 45.2, 192/46

[56] References Cited

U.S. PATENT DOCUMENTS

| 547,386 | 10/1895 | Stewart | 192/46 X |
| 2,240,359 | 4/1941 | Weigel | 192/45.1 |
| 2,779,201 | 1/1957 | Hurley | 192/46 X |

Primary Examiner—Richard Lorence
Attorney, Agent, or Firm—Flehr, Hohbach, Test, Albritton & Herbert

[57] ABSTRACT

A one way drive device, for example an overrunning clutch, is disclosed herein and includes a drive member and a driven member which are mounted for clockwise and counterclockwise rotation about a common axis. The drive member includes a planar drive face normal to the common axis and is adapted for connection with a source of power for rotating the planar drive face either clockwise or counterclockwise. The driven member includes a planar driven face which is positioned in close proximity to and in confronting relationship with the drive face. The drive and driven members are coupled to one another through a series of pockets in one of the drive or driven faces and a plurality of cooperating pawls carried by the other face such that when the drive member is driven counterclockwise, it drives the driven member with it an when the drive member is driven clockwise it does so freely, that is, without driving the driven member.

23 Claims, 6 Drawing Sheets

ONE WAY DRIVE DEVICE

The present invention relates generally to a one way drive device such as an overrunning clutch and more particularly to a specifically designed side-by-side (planar) configured device Generally speaking, there are two basic types of overrunning clutches, ratchet type clutches and traction locking clutches such as a roller ramp or sprag clutch A more detailed discussion of each will follow. For the moment it suffices to point out that ratchets lock by interposing a strut or pawl between the two notched surfaces of two concentrically disposed rotating members Traction type clutches work by using traction to wedge a roller or sprag between the two concentrically disposed rotating members In all of these designs, there are limiting factors effecting torque delivery. One such factor is the angle of attack of the interposed component (the pawls or rollers or sprags) which is the acute angle between an imaginary line drawn through the two contact points on the interposed component and a radial line drawn through the axis of the clutch and one contact point This angle determines the proportion of the compressive load on the interposed component delivered as torque. The sine of this angle multiplied by the compressive load is the amount delivered as torque. When the angle is 90°, all of the compressive load is delivered as torque. Another factor is the speed of operation of the pawls, or rollers or sprags. Still another factor is the strength of these interposed components.

Figure 1:
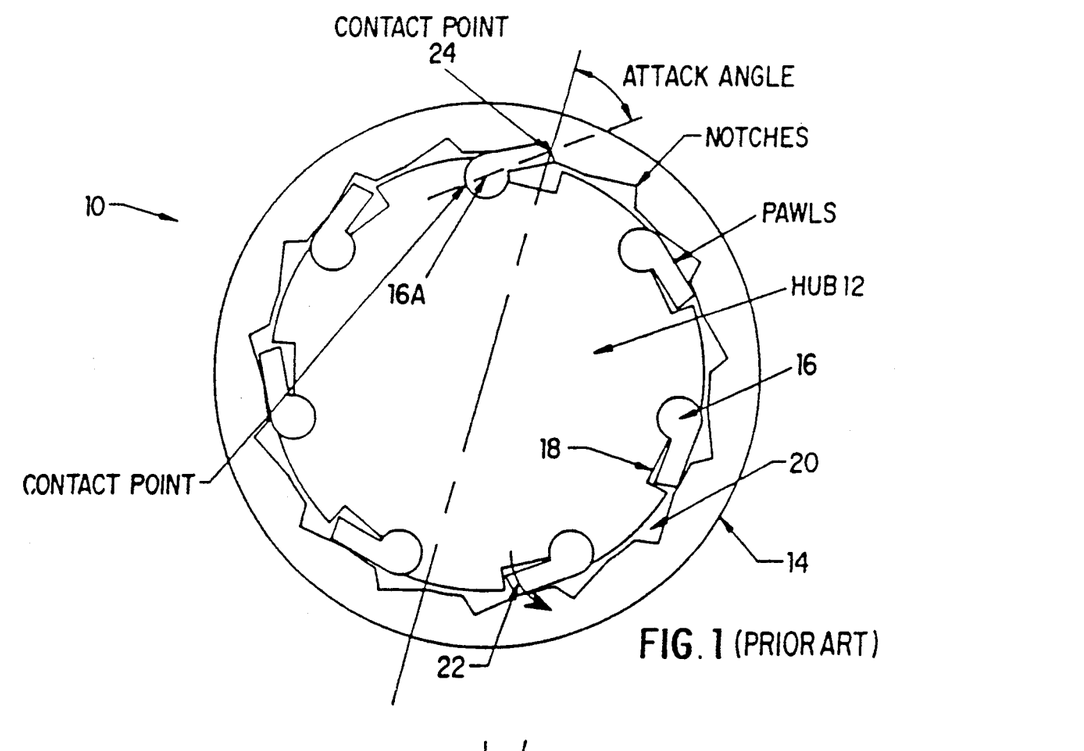
FIG. 1 is a diagrammatic illustration, in side elevational view, of a typical ratchet type of one way drive device designed in accordance with the prior art.

An example of a typical ratchet type of overrunning clutch is illustrated in FIG. 1. The device shown there is generally indicated by the reference numeral 10 and includes an inner hub 12 and a concentrically disposed outer shell 14. The hub 12, which serves as the drive member, carries a plurality of pawls 16 about its outer periphery and within cooperating recesses 18. At the same time, the inner circumference of outer shell 14 defines a series of notches 20 disposed in confronting relationship with pawls 16 and their associated recesses 18. The pawls are spring loaded for outward rotation, as indicated by arrow 22. In that way, when hub 12 is driven clockwise, as viewed in FIG. 1, by means of a suitably coupled source of power, the end of a given pawl, for example, the pawl 16A engages a cooperating shoulder 24 defined by an associated one of the notches 20 and thereby drives the outer shell 14 in a clockwise direction. On the other hand, if the hub 12 is driven in the counterclockwise direction, it rotates freely without moving the outer shell 14.

Figure 2:
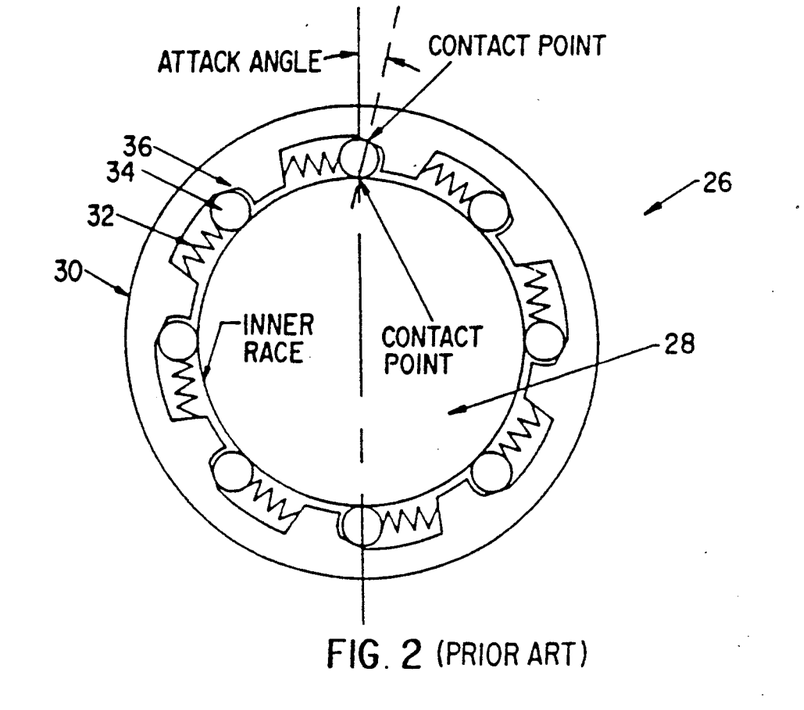
FIG. 2 is a diagrammatic illustration, in side elevational view, of a roller ramp type of one way drive device designed in accordance with the prior art.

Turning to FIG. 2, a typical prior art roller ramp type of overrunning clutch is illustrated and generally designated by the reference numeral 26. This particular one way drive device includes an inner hub 28 which may serve as a driven member and a concentrically disposed outer shell 30 which serves as a drive member As illustrated in FIG. 2, the inner circumference of the outer shell 30 defines a series of circumferentially spaced pockets 32, each of which contains its own spring loaded roller 34. Each roller is movable circumferentially within its respective pocket toward and away from a cooperating ramp 36. Operationally, as the outer shell is rotated counterclockwise, as viewed in FIG. 2, the rollers 34 are squeezed between the inner hub 28 and ramp 34, and thereby causing the inner hub to rotate in the same direction. On the other hand, as the outer shell is rotated clockwise, the rollers position themselves between the non-rampped surfaces of pockets 32 and hub 28, thereby allowing the outer shell to rotate freely without rotating the inner hub.

Figure 3:
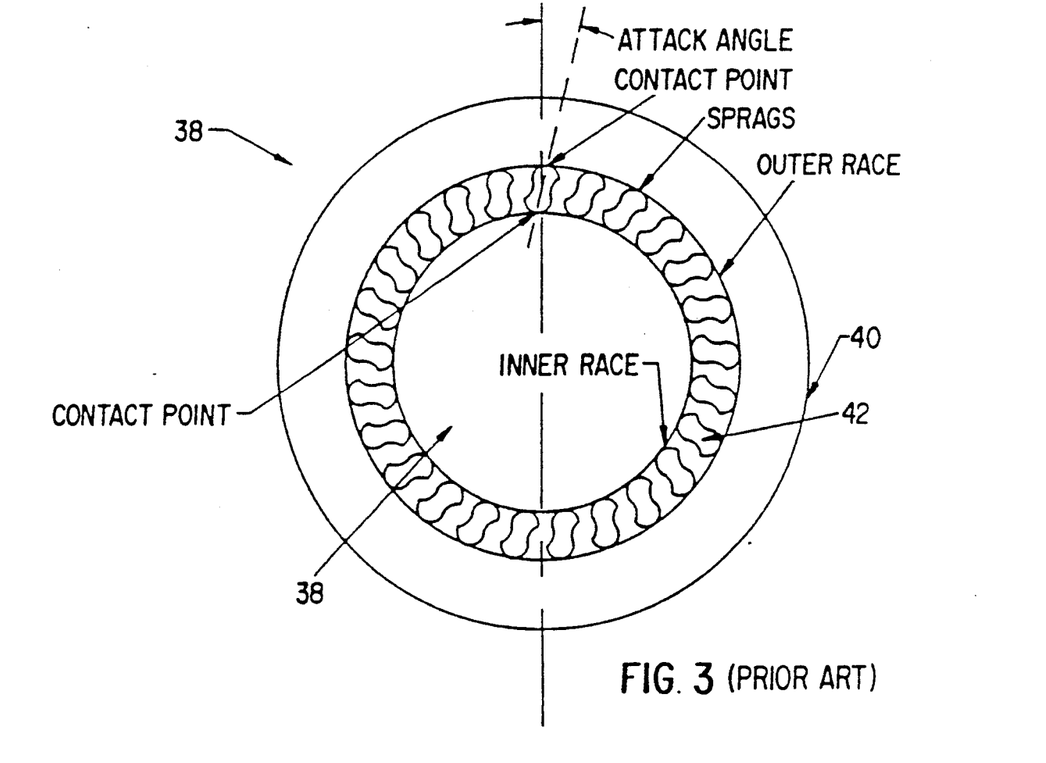
FIG. 3 is a diagrammatic illustration, in side elevational view, of a sprag type of one way drive device designed in accordance with the prior art.

A sprag type of overrunning clutch, which is similar to the roller ramp device, is illustrated in FIG. 3 and generally designated by the reference numeral 38 This device also includes an inner hub and a concentrically disposed outer shell 38 and 40, respectively. Disposed between the two are a series of circumferentially spaced sprags 42 which are mounted for limited pivotal movement clockwise and counterclockwise, as viewed in FIG. 3. When the outer shell 40 is rotated counterclockwise, the sprags 42 are wedged between it and the inner hub so as to cause the latter to rotate in the same direction. On the other hand, when the outer shell is rotated clockwise, the sprags pivot in the same direction but do not wedge between the shell and hub, thereby allowing the shell to rotate freely.

There are a number of drawbacks to the three types of overrunning clutches described immediately above. With specific regard to the ratchet clutch 10, while this design provides for a relatively advantageous attack angle between its pawls 16 and the engaging shoulders 24 of its outer shell 14, the ratchet pawls themselves are relatively large and must move through a large arc to engage shoulders 24. This requires high strength springs and limits each pawl to a low speed operation due to its high moment of inertia. Moreover, since the resolution of engagements (steps) of a ratchet is a factor of the number of pawls and notches in independent engagement, a ratchet type device must sacrifice torque capacity for fine resolution to allow space for many smaller pawls and notches while still not obtaining the benefit of load sharing.

Referring to the roller ramp device 26 illustrated in FIG. 2, while this device has a degree of load sharing amongst its multiple rollers, it displays a very bad attack angle for a roller (typically less than 7°). This means that the rollers transfer only a small amount of the compressive load as torque and deliver at least 95% of its load as a destructive radial force trying to destroy the device Moreover, in the free running direction, the rotating rollers are forced against one point on the ramp while rotating causing accelerated wear and possible permanent deformation.

The sprag type of overrunning clutch 26 shown in FIG. 3 also has a degree of load sharing and the same poor attack angle problems and surface area of contact problems as the roller ramp clutch illustrated in FIG. 2. However, the sprag device contains a greater number of load carrying components and therefore does have an advantage over the roller ramp device in that the wear generated by dragging the sprags is distributed evenly along the race rather than being concentrated at a particular point of contact.

Figure 4:
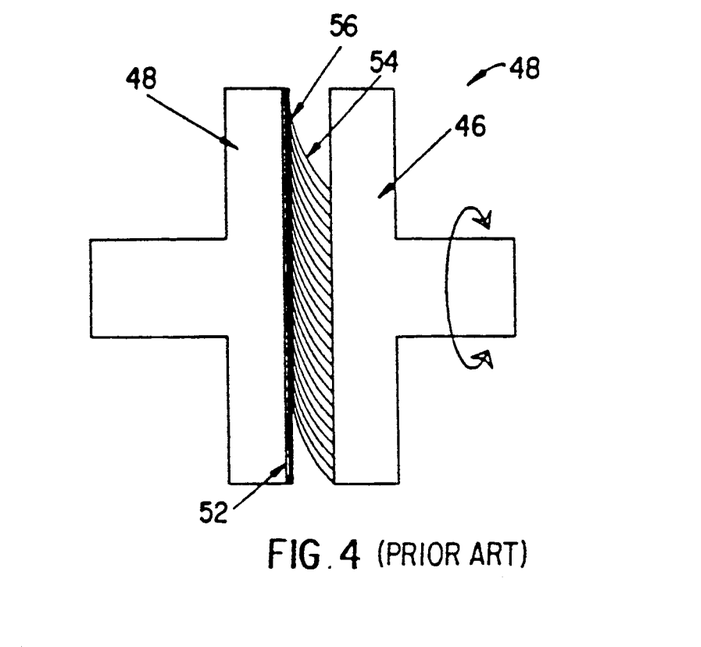
FIG. 4 is a diagrammatic illustration, in plan view, of a side-by-side or planar type of one way drive device designed in accordance with the prior art.

All of the prior art devices described thus far may be characterized as concentric devices, that is, devices including concentrically positioned drive and driven members. FIG. 4 illustrates a prior art one way drive device displaying a side-by-side or planar design, that is, where the drive member and driven member are positioned in confronting planar relationship to one another rather than being concentrically disposed with respect to one another. This device is generally indicated by the reference numeral 44 and its drive and driven members are indicated at 46 and 48 respectively. These drive and driven members include confronting, coaxial faces 50 and 52, respectively, in close proximity to one another. The drive face 50 includes a circular array of angled fibers 54, as shown, which engage in a similarly shaped pattern of material 56 located on driven surface 52. When the drive member is driven clockwise, as viewed from behind the drive member, fibers 54 engage material 56 in order to cause the driven member 48 to rotate in the same direction. On the other hand, when drive member 46 is rotated in the counterclockwise direction, the fibers slide over the material, thereby allowing the drive member to rotate freely. While this type of device may be suitable in low torque applications, it does not lend itself to high torque applications.

The foregoing has been a discussion of various prior art types of one way drive devices All of these devices have associated disadvantages. As will be seen hereinafter, an object of the present invention is to provide a one-way drive device, without those disadvantages.

A more specific object of the present invention is to provide a one way drive device displaying the strength and torque conversion of a ratchet and high speed operating performance better than a sprag or roller ramp clutch, yet with a much higher life expectancy (resistance to deformation) and assured positive drive for critical (no-slip) applications such as those used in, for example, helicopters and elevator conveyor backstops.

Still another specific object of the present invention is to provide a one-way drive device which is used as an overrunning clutch and which can be designed to be smaller and less expensive than a sprag clutch of similar rating.

As will be seen hereinafter, the one way drive device disclosed herein includes a drive member, a driven member, and a coupling arrangement. The drive member is mounted for clockwise and counterclockwise rotation about a given axis and includes a planar drive face normal to that axis. The driven member is also mounted for rotation about the same axis and includes a planar driven face which is positioned in close proximity to and in confronting parallel, relationship with the drive face. The coupling arrangement includes a series of pockets in the driven face and a plurality of cooperating pawls carried by the drive face for causing the drive member to rotate the driven member in the clockwise direction about a given axis when the drive member is rotated clockwise by a suitable source of power. At the same time, the coupling arrangement allows the drive member to rotate freely about the given axis in the counterclockwise direction without rotating the driven member. In actual operation, the pawls of the present invention function in a manner similar to the pawls 16 forming part of previously described device 10. That is, when the drive member disclosed herein is driven clockwise, the drive head on one of the pawls engages a cooperating shoulder defined by one of the pockets in the driven member, and it does so at a relatively high attack angle, as will be seen. In that way, most of the compressive force on the pawl is delivered as torque. At the same time, as will also be seen, in order for the pawl to engage its associated pocket, the pawl only needs to rotate a small amount, as compared to its counterpart pawl 16 of device 10. Further, since the pawls of the present invention are long and narrow in an actual working embodiment and pivot about their longitudinal axes, again as will also be seen, they not only pivot quickly to their engaging positions about small pivot angle, but they do so with a low moment of inertia which requires lower force springs. This allows the device to operate as a high speed overriding clutch. A further advantage of this strut configuration resides in the orientation of the axis of rotation of the struts. Specifically notice that this axis extends radially with respect to the axis of rotation. This means that strut pivoting is immune to centrifugal effects of overall device rotation.

Other advantages of the present invention will be apparent hereinafter from the following detailed description in conjunction with the designs, wherein.

Figures 5, 5A, 6, 7:
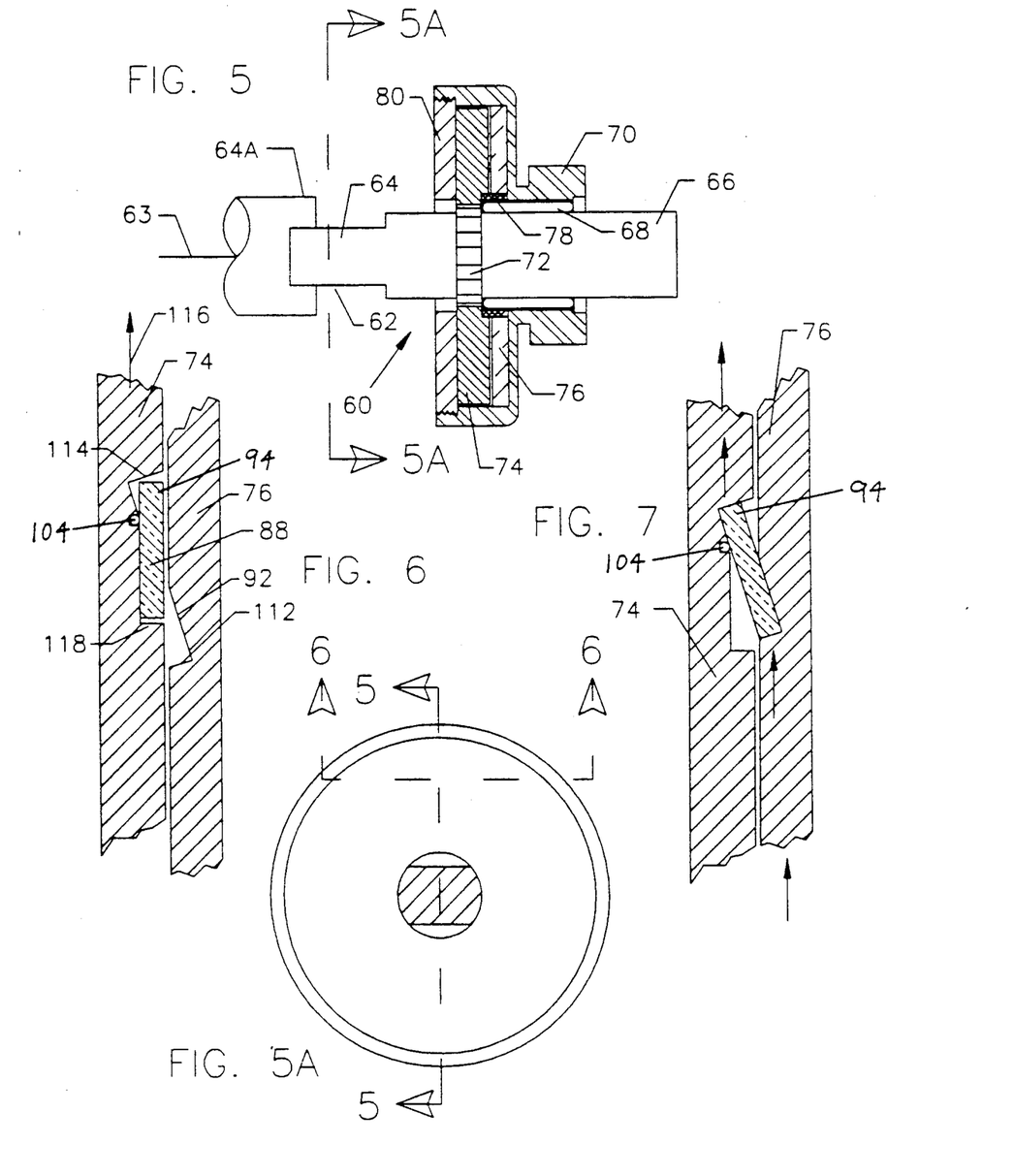
FIG. 5 is a diagrammatic illustration, in axial sectional view, of a one way drive device designed in accordance with the present invention taken generally along the line 5—5 in FIG. 5A.
FIG. 5A is a sectional view of the device of FIG. 5, taken generally along the line 5A—5A in FIG. 5.
FIG. 6 diagrammatically illustrates in section view a portion of the device of FIG. 5, specifically portions of its drive and driven members with a coupling arrangement therebetween, taken generally along the line 6—6 in FIG. 5A, which coupling arrangement is shown in an uncoupled operating condition.
FIG. 7 is a view similar to FIG. 6 but illustrating the driving and driven members being coupled together for rotation.

Turning now to the drawings, attention is immediately directed to FIG. 5, inasmuch as FIGS. 1-4 have been discussed previously. FIG. 5 illustrates a one-way drive device which is designed in accordance with the present invention and which is generally indicated by the reference numeral 60. This device includes an input shaft 62 having one end section 64 which is adapted to be connected to a source of power shown diagrammatically at 64A for rotating the shaft clockwise and counterclockwise about this longitudinal axis 63. The opposite end section 66 of the input shaft supports a bearing 68 which, in turn, supports an output shell 70 for rotation about the input shaft. The input shaft also includes a series of circumferentially spaced splines 72 which support a strut plate 74 for both clockwise and counterclockwise rotation with the input shaft. As will be seen hereinafter, strut plate 74 serves as the drive member for the overall one way drive device 60.

Still referring to FIG. 1, device 60 is shown including an receptor plate 76 which, as will be seen, serves as a driven member in the overall one way drive device 60. A thrust tube 78 is disposed concentrically around bearing 68 and supports receptor plate 76 for both clockwise and counterclockwise rotation about axis 63. Note specifically that the thrust tube is affixed to receptor plate 76 in its entirety and also extends into a cooperating recess in strut plate 74 and, thereby, partially supports the strut plate for rotation about axis 63. In this way, the thrust tube allows the two plates to rotate independently around a common center while preventing axial misalignment between the two which may be caused as a result of the reaction to forces transmitted from plate 74 to plate 76 when the two are coupled together in the manner to be described hereinafter.

As will be described in more detail hereinafter, overall one way drive device 60 includes an arrangement designed in accordance with the present invention for coupling strut plate 74 and receptor plate 76 together for rotation with input shaft 62 about axis 63 when the input shaft and strut plate are rotated counterclockwise At the same time, this coupling arrangement allows the input shaft and strut plate to rotate freely in the clockwise direction, that is, without imparting rotational movement to the receptor plate. In other words, when the strut plate 74 is driven counterclockwise, it serves as a drive member for rotating receptor plate 76 in the same direction and the receptor plate serves as a driven member. At the same time, output shell 70 is fixedly connected to the receptor plate 76 for rotation with the latter and, hence, serves as a means for connecting the output rotation to an external member (not shown). As illustrated in FIG. 5, the output shell 70 extends entirely around the outer peripheries of the strut and receptor plates and includes a thread connected front plate 80 so as to form an enclosure containing the various components therein. This enclosure also provides support to back up any axial thrust generated between plates 74 and 76. Also, suitable liquid seal bearings (not shown) can be provided between output shell 70 and input shaft 62 on opposite sides of the plates 74 and 76 so that the cavity containing these latter plates can be filled with oil for purposes of lubrication and also to hydrodynamically float the two plates away from one another when plate 74 is free-wheeling in the clockwise direction.

Figure 8:
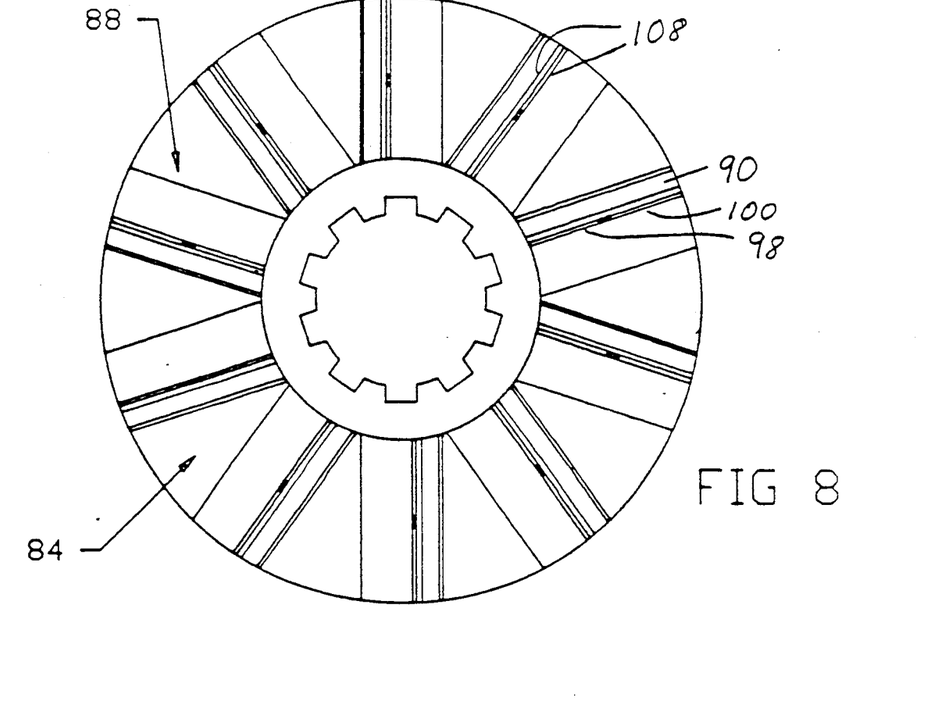
FIG. 8 is a side elevational view of the drive member of the device of FIG. 5.
Figure 9:
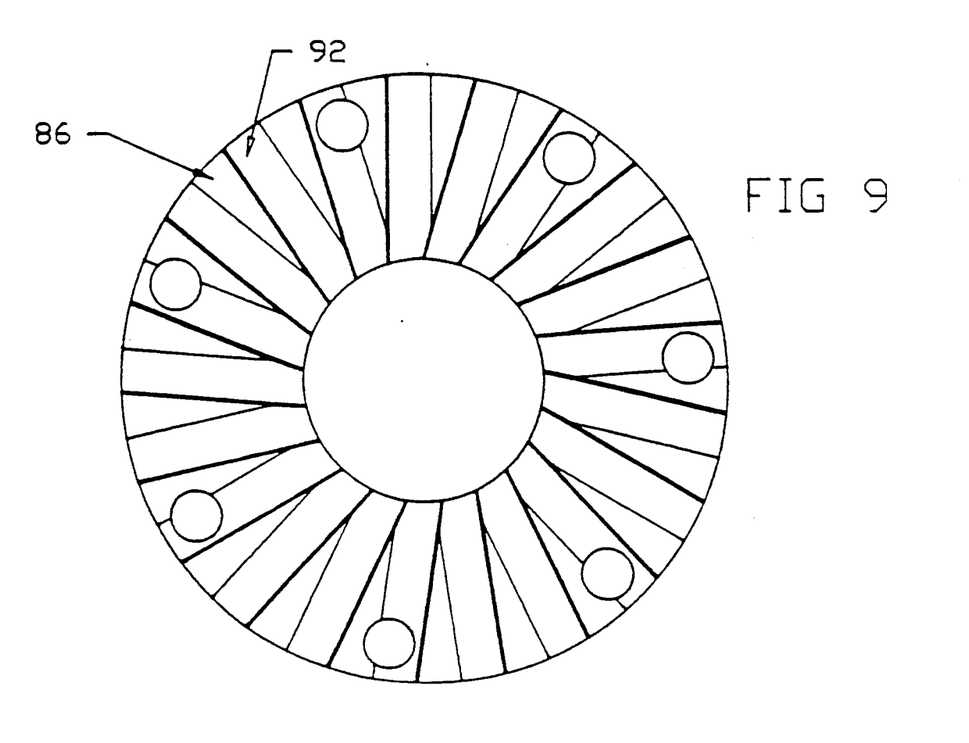
FIG. 9 is a side elevational view of the driven member of the device of FIG. 5.

The overall coupling arrangement discussed briefly immediately above will now be described in detail. This arrangement utilizes the confronting faces 84 and 86 of plates 74 and 76, respectively, which faces are best illustrated in FIGS. 8 and 9. As illustrated in FIG. 8, face 84, which serves as a drive face, includes a series of uniformly circumferentially spaced pockets 88 extending radially along the entire radial extent of face 84 Each pocket 88 contains a strut assembly 90 which will be described in detail hereinafter in conjunction with FIGS. 10-12. Surface 86 also includes a series of uniformly circumferentially spaced pockets 92, greater in number than pockets 88, extending radially the entire extent of face 86. All of the pockets 88 containing their respective strut assemblies and all of the pockets 92 together comprise the coupling arrangement described above. As will be seen below, when strut plate 74 (the drive member) is rotated counterclockwise (as viewed along axis 63 from left to right in FIG. 5), one of the strut assemblies 90 engages one of the pockets 88 in a way which causes receptor plate 76 (the driven member) to rotate with the strut plate. On the other hand, when the strut plate is rotated clockwise, all of the strut assemblies functionally remain in their respective pockets 88 and do not engage any of the pockets 92. As a result, strut plate 74 rotates freely in the counterclockwise direction.

Figure 10:
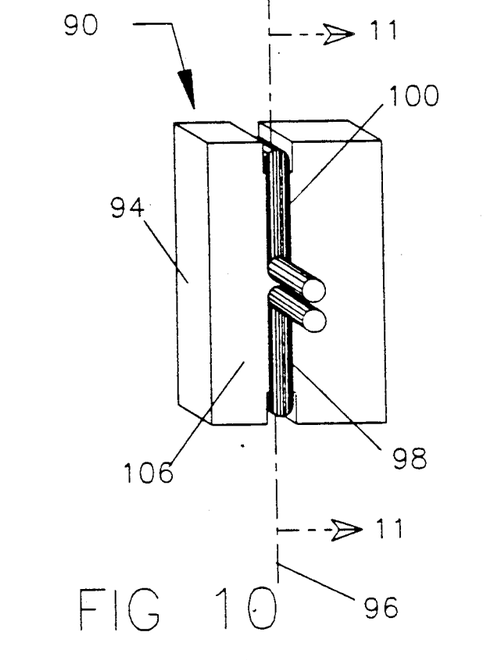
FIG. 10 is a diagrammatic illustration, in perspective view, of a pawl or strut assembly forming part of the coupling arrangement of the device of FIG. 5.
Figure 11:
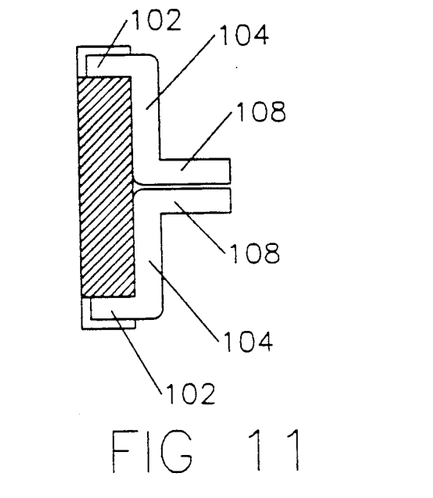
FIG. 11 is a longitudinal sectional view of the pawl arrangement of FIG. 10, taken generally along the line 11 in FIG. 10.
Figures 12, 13:
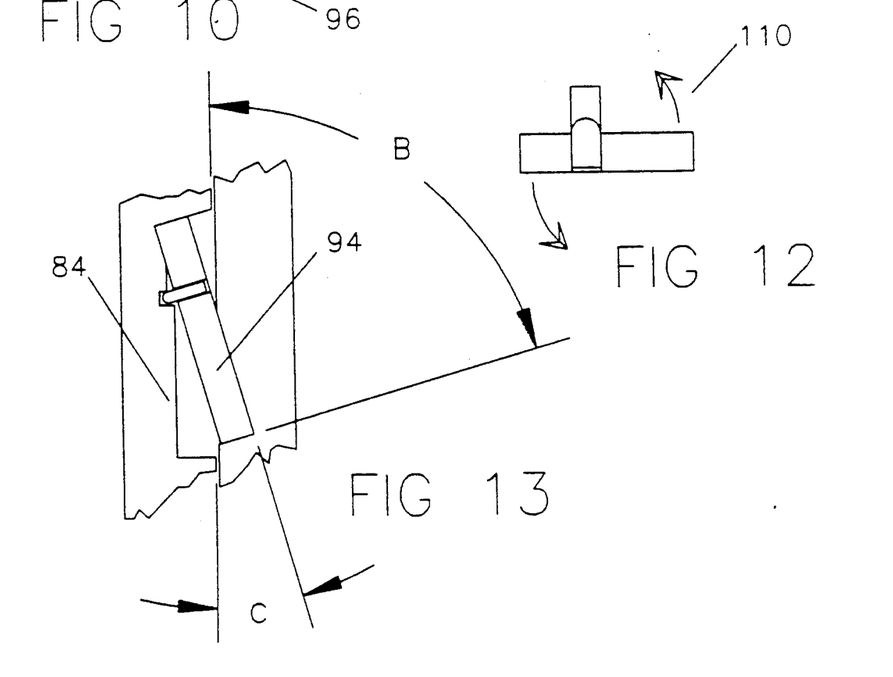
FIG. 12 is a top plan view of the pawl or strut assembly of FIG. 10.
FIG. 13 diagrammatically illustrates how the pawl or strut arrangement of FIG. 10 moves between a coupling position and an uncoupled position.

Turning specifically to FIGS. 10-12, one of the strut assemblies 90 is shown including a longitudinally extending strut 94 which is rectangular in cross section and which is longer than it is wide and wider than it is thick, whereby to define a lengthwise axis 96 through its center. The assembly also includes a z shaped inboard torsion spring 98 and a similarly shaped outboard torsion spring 100 which serve to support their associated strut 94 in a cooperating pocket 88, in a spring loaded fashion. Specifically, as illustrated best in FIG. 10 and 11, the inboard torsion spring 98 includes one end segment 102 disposed within a cooperating recess centrally located in the bottom end of the strut, a central segment 104 extending along the backside 106 of the strut and a top section 108 extending out from and normal to backside 106. The outboard torsion spring 100 is similarly positioned along the end of the strut which includes a cooperating recess at its top end. As illustrated best in FIGS. 6 and 7, a given strut 94 is shown disposed within and substantially entirely fills its cooperating recess or pocket 88 with adjacent end sections 108 of springs 98 and 100 in cooperating holes in the recesses (see FIG. 8) and with sections 104 in cooperating slots lengthwise across the back of the pocket (see FIGS. 6 and 7). Moreover, the springs are designed so that they are at rest when the strut is rotated a fixed angle (20° in an actual working embodiment) out of the plane of face 84 of plate 74. In that way, the strut is spring loaded to rotate about longitudinal axis 96 in the directions indicated by arrows 110 in FIG. 12.

Still referring to FIGS. 6 and 7, it should be noted that each pocket 92 extends into receptor plate 76 at an acute angle with its face 84 and defines a strut engaging surface 112 which defines one entire lengthwise edge of the pocket. At the same time, pocket 88 includes an inwardly angled lengthwise section that defines its own strut engaging shoulder 114 that is parallel to shoulder 112 when the two pockets are radially aligned with one another. So long as any given pocket 88 is not in radial alignment with any given pocket 92, the surface 86 of plate 76 forces the strut 88 in that pocket to remain entirely recessed therein, as illustrated in FIG. 6. Thus, if plate 74 is rotated clockwise, as indicated by arrow 116 in FIG. 6, the struts 94 will pass over the pockets 92 without engaging the shoulders 112. If the plate 74 is rotated fast enough, the struts will not even have much time to momentarily pivot into pockets 92. On the other hand, if plate 74 is rotated counterclockwise, in the opposite direction to arrow 116, there will be a first pocket 88 which radially aligns itself with a first pocket 92 before any other pockets 88 and 92 do so. When this occurs, the strut 94 in that first pocket 88 will pivot upward towards its biased spring loaded position, as illustrated in FIG. 13, until its forwardmost lengthwise edge 118 engages shoulder 112, thereby causing plate 76 to rotate with plate 74. At the same time, the back lengthwise edge 120 of the strut will engage the shoulder 114.

With particular reference to FIG. 13, note at the outset that shoulder 112 of pocket 92 extends into surface 86 at an acute angle B with that surface. This is the "attack angle", in which the strut engages shoulder 112 in order to couple the receptor plate 76 to strut plate 74 when the latter is caused to rotate clockwise. If the attack angle B were 90° which would be impossible, the maximum it could be, 100% of the compressive force on the strut would be delivered as torque to the receptor plate. As it is, in an actual working embodiment, the angle B is 77°. At this attack angle, 97.4% of the compressive force on the strut is delivered as torque.

Still referring to FIG. 13, it should be noted that the strut 94 pivots from its extreme nonengaging position entirely within recess 88 to its extreme coupled position in engagement with shoulder 112 through an angle C. Because the strut is long and thin and not very wide, this angle can be relatively small. In an actual working embodiment, each strut is 0.600 inches long, 0.300 inches wide and 0.040 inches thick and pivots about its center axis 96 through an angle C of only 13°. This is to be contrasted with the pawls of the device of FIG. 1 which pivot through angles on the order of 40. At the same time, because struts 94 are long, the surface area of each of their engaging edges 118 and 120 is large and, therefore, each strut is capable of carrying a relatively large compressive load. In addition, because each of the struts is not very wide, it has a very low moment of inertia. In the actual working embodiment, each strut moves from an overrunning position entirely within its recess 88 to a lock-in or coupled position and in engagement with shoulder 112 in 0.5 milliseconds. This makes the overall device suitable as a very high speed overrunning clutch.

As stated previously, there are more pockets 92 in the receptor plate 76 than there are struts on strut plate 74. Moreover, the number of each is selected such that the two numbers do not have a common denominator. As a result, at any instant in time, as the strut plate 74 rotates clockwise relative to receptor plate 76, only one strut can be in precise radial alignment with the cooperating pocket 92. As a result, when the strut plate 74 is first caused to rotate counterclockwise from a stationary position, one and only one of the struts locks into a cooperating recess 92 (note no common denominator). In an actual working embodiment, there are ten struts and twenty-one pockets 92. This provides a "vernier" effect in that there are 210 different engagement positions within each resolution of the receptor plate relative to the strut plate. This gives a minimum revolution of one possible engagement every 1.7° of relative movement. What that means, is that the strut plate has to rotate in the cocking direction at most 1.7° before one of the struts will lock into a cooperating recess. As a result, the strut plate cannot pick up much speed at all before it locks with the receptor plate reducing shock and, hence, this coupling operation is relatively smooth.

Figure 14:
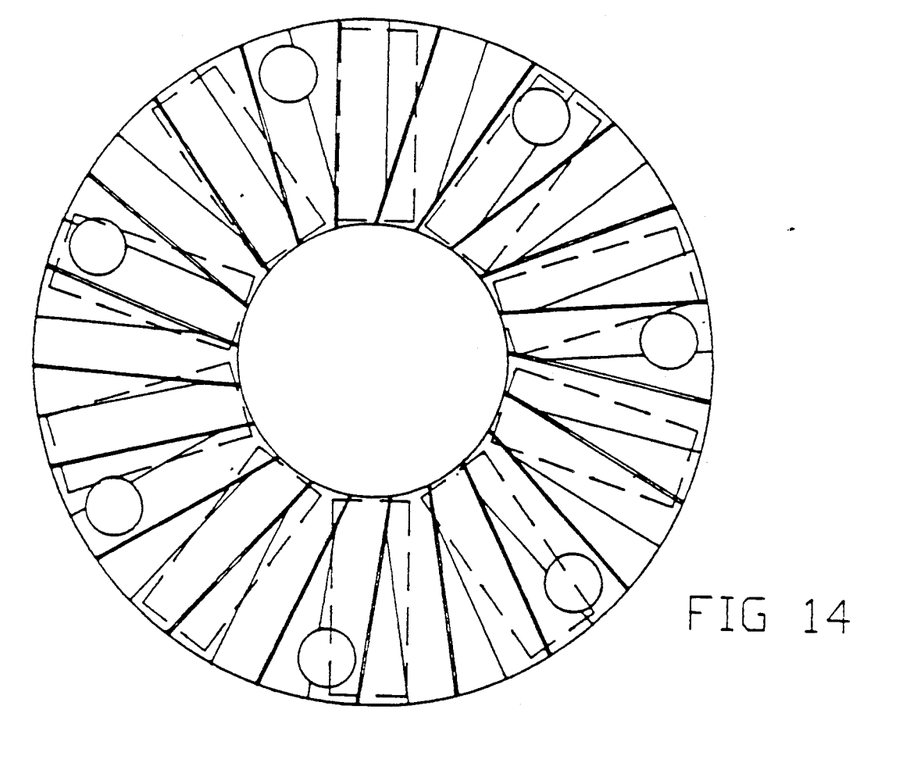
FIGS. 14 and 15 are further diagrammatic illustrations of the way in which the coupling arrangement of FIGS. 10-13 moves between its coupled and uncoupled positions.
Figure 15:
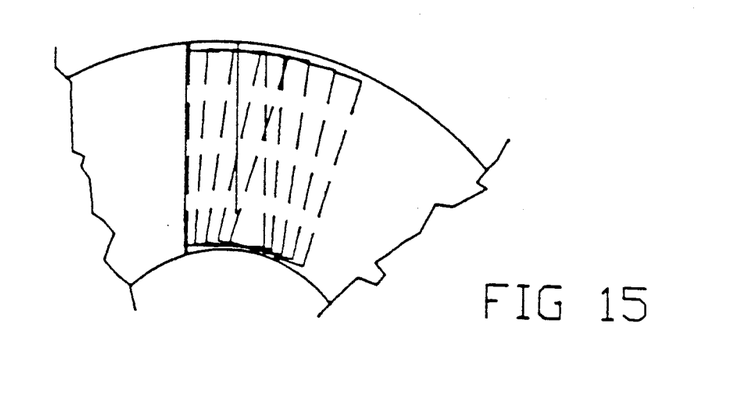

A particular advantage to having radially extending struts 94 and radially extending pockets 92 relates to the way in which the struts operate when the strut plate is caused to free wheel in the counterclockwise direction, as shown in FIG. 14. One such strut is shown in FIG. 15 approaching a cooperating pocket as the strut moves clockwise. Note specifically that the only time the strut is able to pivot outward from its FIG. 6 position to its FIG. 7 position is when the strut is in precise radial alignment with the pocket. At all other times, there is at least a portion of the strut that is not in precise alignment with the pocket and, this portion hence, prevents the strut from pivoting outward. As a result, when the strut plate free wheels at a relatively high speed clockwise, there is only a very small instant in time that the struts are capable of pivoting outward and into an aligned pocket. In most cases, the time is so short that the struts hardly move at all, thereby subjecting them to at most a minimum amount of wear. In fact, if device 60 is filled with oil, as discussed previously, the struts will hardly move at all as strut plate 76 free wheels.

It is to be understood that overall one way drive device 60 may include more or less struts than cooperating pockets and may be used in various applications. Moreover, the drive member (the strut plate) may serve as the driven member and the driven member (the receptor plate) may serve as the drive member. Thus, either the drive member of the driven member can carry the struts and, for the purpose of two claims herein, the two are considered equivalent. As indicated above, device 60 is particularly suitable as an overrunning clutch. However, the present invention is not intended to be limited to that application.

What is claimed is:

1. A one-way drive device, comprising:
   (a) a drive member mounted for clockwise and counterclockwise rotation about a given axis and including a planar drive face normal to said given axis, said drive member being adapted for connection with a source of power for rotating said planar drive face either clockwise or counterclockwise about said given axis;
   (b) driven member mounted for at least counterclockwise rotation about said given axis and including a planar driven face which is positioned in close proximity to and in confronting relationship with said drive face; and
   (c) a coupling arrangement including a first series of driven pockets defining pawl engaging driven shoulders in said driven face, a second series of drive pockets defining pawl engaging drive shoulders in said drive face, and a plurality of cooperating pawls having opposing shoulder engaging edges and carried by said drive face for causing said drive member to rotate said driven member in the counterclockwise direction about said given axis when said drive member is rotated counterclockwise by said source of power and for allowing said drive member to rotate freely about said axis in the clockwise direction without rotating said driven member when said drive member is rotated clockwise by said source of power, said first and second series of pockets and said pawls being configured such that when said drive member is caused to rotate counterclockwise, the opposing shoulder engaging edges of one and only one of said pawls respectively engage the drive and driven shoulders of an adjacent pair of drive and driven pockets in a way which places a compressive load across that pawl between its engaging edges.

2. A device according to claim 1 wherein each of said pawls is longer than it is wide and wider than it is thick whereby to define a lengthwise axis and wherein said coupling arrangement includes means for connecting said pawls to said drive face in spaced apart relationship to one another about said given axis such that the lengthwise axis of each pawl extends radially outward from said given axis.

3. A device according to claim 2 wherein each of said pockets is longer than it is wide and wider than it is deep, whereby to define a lengthwise axis, said pockets being positioned in said driven face in spaced apart relationship to one another about said given axis such that the lengthwise axis of each pocket and its driven shoulder extend radially outward from said given axis.

4. A device according to claim 3 wherein said coupling arrangement includes a greater number of pockets than pawls.

5. A device according to claim 4 wherein each of said pawls is connected to said drive face within its own recess formed by an associated one of said drive pockets and wherein said connecting means includes a spring mechanism for each of said pawls, each of said spring mechanism supporting its associated pawl for pivotal movement about the lengthwise axis of the pawl between a first, forced position entirely within its own recess and a second, biased position in which a portion of the pawl including a shoulder engaging edge thereof extends outside its recess such that the extended edge of said pawl is in a position to engage a particular driven shoulder of one of said driven pockets when said drive member is rotated counterclockwise to thereby cause said drive member to rotate said driven member counterclockwise, but does not engage said particular driven shoulder when the drive member is rotated clockwise.

6. A device according to claim 5 wherein each of said spring mechanisms supports its associated pawl for pivotal movement between its first and second positions such that the pawl pivots at most about 13° between these positions.

7. A device according to claim 5 wherein each driven shoulder of each of said driven pockets is a planar shoulder which defines one lengthwise edge of the pocket and which lies widthwise in a plane extending at a particular angle with the plane containing said driven surface.

8. A device according to claim 7 wherein said particular angle of each of said shoulders is about 77°.

9. A device according to claim 1 including a thrust tube which defines said given axis about which both said drive and driven members rotate, said thrust tube supporting said driven member in its entirely and partially supporting said drive member, whereby to insure axial alignment between said drive and driven members, said device further including means for coupling said drive member to said source of power.

10. A device according to claim 1 including means connected with said driven member and extending from said driven member around the outer periphery of said drive member and along the face of said drive member opposite said drive face, whereby to form a housing around said drive member.

11. A device according to claim 1 wherein each of said pawls is wider than it is thick and wherein the shoulder engaging edges of each pawl are generally rectangular, flat surfaces defined by the thickness and length of the pawl such that the compressive load placed across said one pawl during counterclockwise rotation of said drive and driven members extends across the width of said one pawl.

12. A device according to claim 11 wherein each of said pawls is longer than it is wide.

13. A device according to claim 11 wherein said coupling arrangement includes means for connecting each of said pawls to said drive face for movement between a first biased position in engagement with the driven shoulders of said driven member and a second position out of engagement with said driven shoulders, said pawls and their respective connecting means being configured such that the compressive load placed across said one pawl during counterclockwise rotation of said drive and driven members is taken up substantially entirely by said drive and driven members and said one pawl and not by the pawl's connecting means.

14. A device according to claim 13 wherein each of said connecting means supports its associated pawl for pivotal movement between its first and second positions about an axis through the pawl parallel with its opposing shoulder engaging edges such that the pawl pivots at most about 13° between its first and second positions.

15. A one-way drive device, comprising:
(a) a drive member mounted for clockwise and counterclockwise rotation about a given axis and including a planar drive face normal to said given axis, said drive member being adapted for connection with a source of power for rotating said planar drive face either clockwise or counterclockwise about said given axis;
(b) a driven member mounted for at least counterclockwise rotation about said given axis and including a planar driven face which is positioned in close proximity to and in confronting relationship with said drive face; and
(c) a coupling arrangement including a first series of drive pockets having drive shoulders in said drive member, a second series of driven pockets having driven shoulders in said driven faces and a plurality of cooperating pawls having opposing shoulder engaging edges carried by one of said faces for causing said drive member to rotate said driven member in the counterclockwise direction about said given axis when said drive member is rotated counterclockwise by said source of power and for allowing said drive member to rotate freely about said axis in the clockwise direction without rotating said driven member when said drive member is rotated clockwise by said source of power, said first and second series of pockets and said pawls being configured such that when said drive member is caused to rotate counterclockwise, the opposing shoulder engaging edges of one and only one of said pawls respectively engage the drive and driven shoulders of an adjacent pair of drive and drive pockets in a way which places a compressive load across that pawl between its engaging edges.

16. A device according to claim 15 wherein each of said pawls is wider than it is thick and wherein the shoulder engaging edges of each pawl are generally rectangular, parallel, flat surfaces defined by the thickness and length of the pawl such that the compressive load placed across said one pawl during counterclockwise rotation of said drive and driven members extend across the width of said one pawl.

17. A device according to claim 16 wherein each of said pawls is longer than it is wide.

18. A device according to claim 16 wherein said coupling arrangement includes means for connecting each of said pawls to said drive or driven face, said pawls and their respective connecting means being configured such that the compressive load placed across said one pawl during counterclockwise rotation of said drive and driven members is taken up substantially entirely by said driven and driven members and said one pawl and not by the pawl's connecting means.

19. A one-way drive device, comprising:
(a) a drive member mounted for clockwise and counterclockwise rotation about a given axis and including a planar drive face normal to said given axis, said drive member being adapted for connection with a source of power for rotating said planar drive face either clockwise of counterclockwise about said given axis;
(b) a driven member mounted for at least counterclockwise rotation about said given axis and including a planar driven face which is positioned in close proximity to and in confronting relationship with said drive face; and
(c) a coupling arrangement including said drive and driven faces and coupling means between said faces for causing said drive member to rotate said driven member in the counterclockwise direction about said given axis when said drive member is rotated counterclockwise by said source of power and for allowing said drive member to rotate freely about said axis in the clockwise direction without rotating said driven member when said drive member is rotated clockwise by said source of power, said drive and driven faces and said coupling means being configured such that when said drive member is caused to rotate counterclockwise, said coupling means engages said drive and driven faces in a way which places a compressive load across the coupling means between said drive and driven members, said coupling means including a pawl having opposing edges that are caused to engage the drive and driven faces of said drive and driven members in a compressive load bearing way as the latter rotate counterclockwise, and wherein said pawl is wider than it is thick and each of said opposing edges is a generally rectangular, parallel, flat surface defined by the thickness and length of the pawl.

20. A device according to claim 19 wherein said pawl is longer than it is wide.

21. A device according to claim 19 wherein said coupling arrangement includes means for connecting said pawl to one of said drive or driven faces for movement between a first load carrying position when the drive and driven members rotate counterclockwise and a second position when the members rotate clockwise, said pawl and said connecting means being configured such that the compressive load placed across said pawl during counterclockwise rotation of said drive and driven members is taken up substantially entirely by said drive and driven members and said pawl and not by the pawl's connecting means.

22. A device according to claim 21 wherein said connecting means supports said pawl for pivotal movement between its first and second positions about an axis through the pawl parallel with its shoulder engaging edges such that the pawl pivots at most about 13° between its first and second positions.

23. A device according to claim 19 wherein said coupling arrangement includes a series of pawls having opposing edges, said drive and driven faces and said pawls being configured such that when said drive and driven members rotate counterclockwise, one and only one of said pawls engage said drive and driven members in a compressive load bearing manner.

* * * * *